Aug. 15, 1967     C. MACKIEWICZ     3,335,900
ELECTRICAL WIRING DEVICE WITH SNAP ACTION COVER
Filed Feb. 10, 1965        2 Sheets-Sheet 1
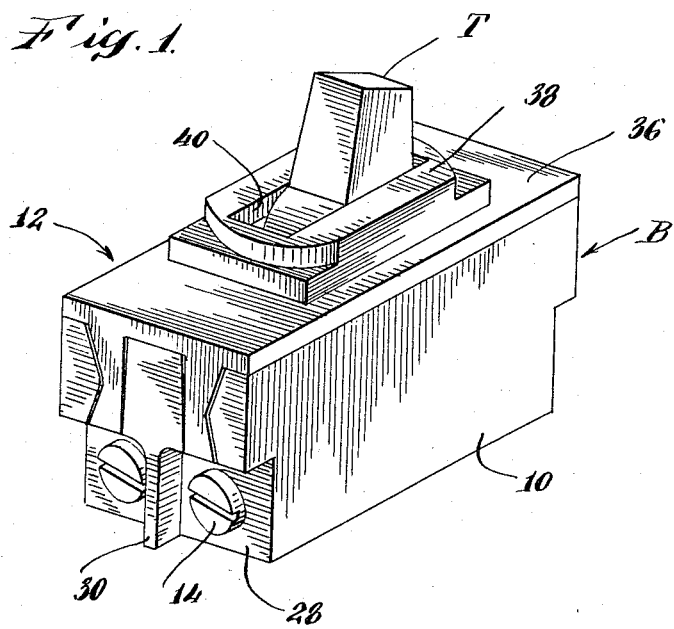
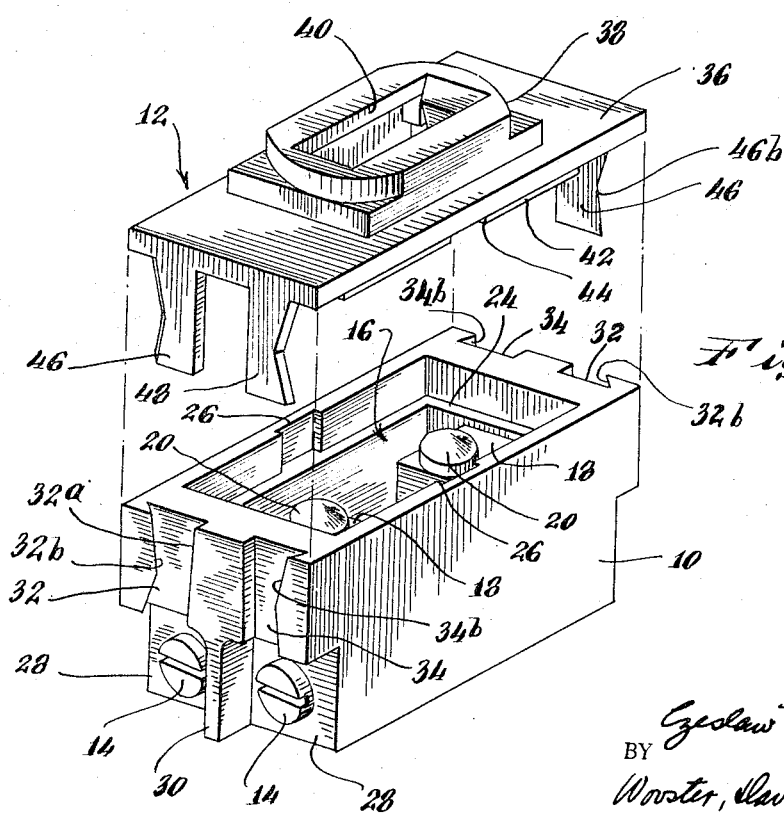
INVENTOR.
Czeslaw Mackiewicz
BY Wooster, Davis & Cifelli
ATTORNEYS

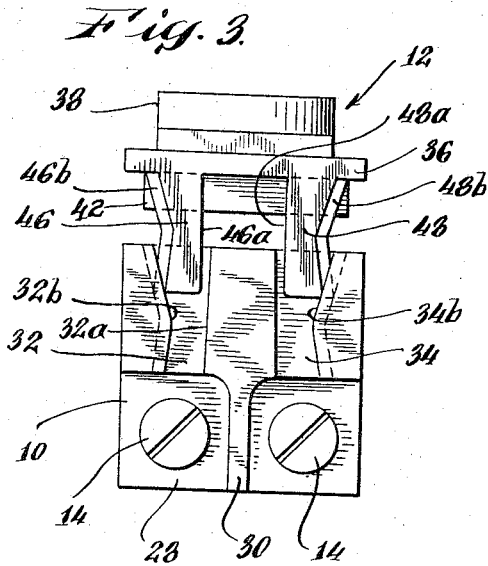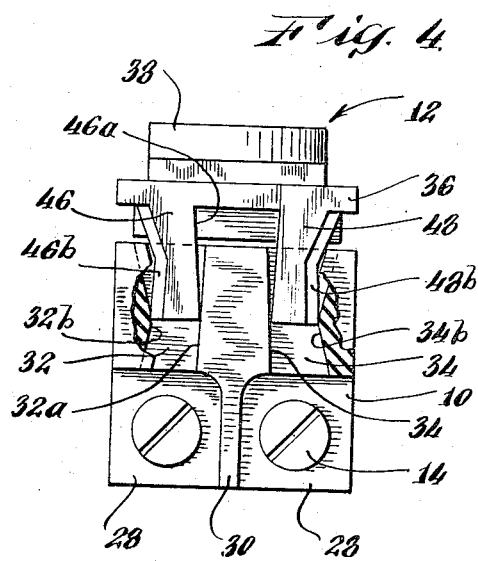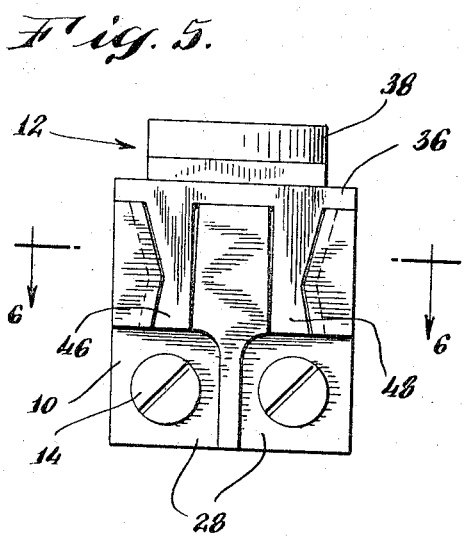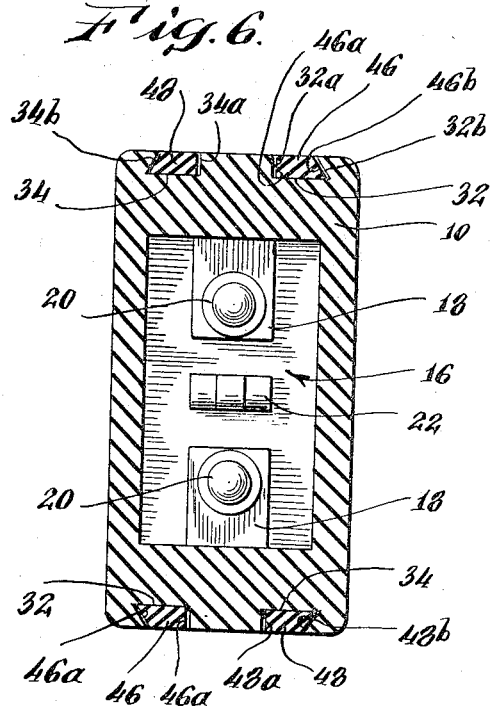

United States Patent Office 3,335,900
Patented Aug. 15, 1967

3,335,900
ELECTRICAL WIRING DEVICE WITH SNAP ACTION COVER
Czeslaw Mackiewicz, Trumbull, Conn., assignor to Harvey Hubbell, Incorporated, Bridgeport, Conn., a corporation of Connecticut
Filed Feb. 10, 1965, Ser. No. 431,665
8 Claims. (Cl. 220—60)

ABSTRACT OF THE DISCLOSURE

The invention comprises a snap action cover and housing for an electrical wiring device. Each end of the housing defines a locking channel extending downwardly from its top having a narrowed central portion and an outwardly angled lower portion. Each end of the cover includes a resilient locking prong designed to advance into a channel and having a configuration similar to that of the channel.

This invention relates to an electrical wiring device having an improved body construction and, more particularly, to such a device of the interchangeable type.

Interchangeable electrical wiring devices are employed to give maximum flexibility to a wiring installation. In using the interchangeable principle, many different types of electrical wiring devices can be selectively mounted in a standard wiring box. Such devices might include, for example, various types of electrical outlets, switches, pilot lights, etc. Interchangeable devices are normally furnished without the integral mounting yokes that are customary with standard electrical wiring devices. Instead, a special mounting strap is employed which includes openings arranged to engage and retain the selective devices. For example, in an exemplary installation, three interchangeable toggle switches might be positioned in a single mounting strap which is, in turn, secured to the wiring box. A single wall plate having three openings for the switch toggles is then positioned over the box and secured in place. It will be apparent that one of the requirements for interchangeable wiring devices is compactness. It will also be obvious that any possible cost reduction in the highly competitive electrical wiring device industry will be beneficial both to the manufacturer and to the ultimate consumer.

In the interchangeable wiring devices known to the prior art, the body comprises two parts, viz., a housing of insulation material that is provided with a metallic cover which snaps onto the housing and locks together the body and various elements of the device. As is well known, metal parts are expensive and difficult to fabricate. Furthermore, they may require plating in order to protect them from corrosion.

Accordingly, it is the primary object of the present invention to provide an improved interchangeable wiring device having an improved body construction with an improved snap action cover. Other objects are to provide such a device wherein the cover is non-metallic, inexpensive, simple to fabricate, and reliable in operation. The manner in which the foregoing objects are achieved will be more apparent from the following description, the appended claims and the figures of the attached drawings wherein:

FIG. 1 illustrates a perspective view of an interchangeable electrical switch constructed in accordance with the present invention;

FIG. 2 illustrates the switch housing and cover of the switch of FIG. 1 separated from one another;

FIG. 3 is an end view of the switch housing and cover shown in FIG. 2, showing the cover being advanced onto the switch housing;

FIG. 4 is a view similar to FIG. 3, but showing the cover further advanced onto the switch housing;

FIG. 5 is a view similar to FIG. 4, showing the cover in fully mounted position on the switch housing; and FIG. 6 is a cross section taken along the line 6—6 of FIG. 5.

The objects of the invention are achieved in general by means of an improved wiring device body construction including a housing and a detachable snap action cover. The housing is formed of a rigid electrical insulating material and has channels in its end walls, and the cover is formed from a resilient material and includes integral locking prongs which are insertable into the channels to retain the cover in assembled position on the housing.

In the drawings, the invention is illustrated as embodied in an electrical switch, and it will be so described herein; however, it is not limited to incorporation in an electrical switch, as it can be embodied in any type of interchangeable wiring device, such as a switch, outlet, pilot light, etc.

FIG. 1 illustrates an assembled interchangeable switch constructed in accordance with the invention including a body B and a protruding actuating toggle T. The body B includes a housing 10 and cover 12. Binding screws 14 are mounted in the housing in accordance with the usual practice to function as detachable terminals for conductor wires.

In FIG. 2 the body B is illustrated with the cover 12 separated from the housing 10. Inasmuch as the specific electrical switching mechanism forms no specific part of this invention, it is not illustrated herein. With particular reference to FIG. 2, it will be noted that housing 10 is substantially box-shaped and of rectangular cross section. The housing 10 is formed of a rigid insulating material, such as Bakelite, and defines an internal switching chamber 16 which normally contains the switch mechanism. Extending into chamber 16 from either end of the housing 10 is a wall portion 18 which carries on its upper surface a conical rubber bumper 20 which serves as a stop for portions of the toggle T and quiets the action of the switch. There is also mounted in the base of chamber 16 a short stud 22 (FIG. 6) which retains and positions one end of the usual toggle actuating coil spring.

The upper portion of switching chamber 16 is slightly larger than the lower portion so as to define an inwardly extending ledge 24 against which a portion of cover 12 may be seated to form a seal. In addition, the upper side walls are provided with notches 26 for receiving the ends of the usual pivot arms of the toggle which rest upon ledge 24. On its outer side, each end wall of the housing 10 is cut away to form a pair of corner recesses 28 separated by a vertical rib 30. Recesses 28 provide the necessary clearance for wiring conductor wires to binding screws 14. The upper portion of each outer end wall of the housing 10 defines a pair of spaced channels, a left channel 32 and a right channel 34. The two channels in each end wall are mirror images of one another, and each includes a straight inner side 32a, 34a, and a V-shaped undercut outer side 32b, 34b. The back surface of each of the left and right channels is planar.

The cover 12 is formed from a single piece of an electrical insulating material that is resilient relative to the housing 10, nylon having been found well suited in practice. The cover 12 includes a flat upper surface 36 and a centrally positioned raised boss 38 which defines a rectangular opening 40 of the toggle T. A rectangular flange 42 depends from the underside of the cover and is dimensioned so as to fit in the upper portion of chamber 16 and rest against the ledge 24 of housing 10, when it is assembled thereto. Flange 42 includes notches 44 which are aligned with the notches 26 of housing 10 to position and retain the pivot arms of toggle T against ledge 24. Each end of the cover 12 includes a pair of depending locking prongs, a left locking prong 46 and a right locking prong 48. Each of the prongs is substantially similar in cross section to one of the channels 32, 34. For example, each prong includes a straight inner edge 46a, 48a and a V-shaped outer edge 46b, 48b, which is tapered to match the undercut portions of the corresponding channels.

The operation of the snap action cover locking feature is most clearly indicated in the sequence of FIGS. 3–5. The first step is shown in FIG. 3, wherein cover 12 is so positioned relative to housing 10 that the lower ends of the locking prongs 46 and 48 at each end of the cover have entered the enlarged entrance portions of corresponding channels 32, 34 of housing 10. In FIG. 3, the lower outer corners of the locking prongs have contacted the undercut outer sides 32b, 34b of the channels. As cover 12 is forced further downward, the locking prongs 46, 48 are cammed inwardly against the natural resilience of the nylon. This is illustrated in FIG. 4, wherein each of the prongs 46, 48 has reached its position of maximum stress with its lower outer corner at the apex of one of the V shaped outer sides 32b, 34b, and its lower inner corner in contact with one of the straight inner sides 32a, 34a, with the lower portions of the prongs under compression and somewhat compressed. During this period of maximum stress, the locking prongs are retained against the back surfaces of the channels 32, 34 by virtue of the interlocking relationship between the tapered outer edges of the prongs and the undercut outer sides of the channels. Further advancement of the cover 12 carries the lower end of each locking prong past the apex of its associated V-shaped side to snap into the fully assembled, closed position shown in FIG. 5. It will be noted from FIG. 5 that each of the locking prongs 46, 48 is now mated with a corresponding one of the channels 32, 34 and that the V shaped formation provides a locking action which prevents the cover 12 from being removed without exerting sufficient force to deform the nylon prongs. As the deformation experienced by the nylon is well within its elastic limit, the cover may be removed from and replaced upon the housing repeatedly at will without diminishing the effectiveness of its locking action.

It will now be apparent to those skilled in the art that the exemplary switch body construction which has been described herein accomplishes the various objects set forth above. It will also be apparent that it is applicable to any electrical wiring device, particularly of the interchangeable type, and that a number of variations and modifications may be made in this invention without departing from its true spirit and scope. Accordingly, the foregoing description is to be construed as illustrative only, rather than limiting. This invention is limited only by the scope of the following claims.

What I claim as new and desire to secure by Letters Patent of the United States is:

1. A body for an electrical wiring device which comprises: a housing having an open top and a first and a second end, each of said housing ends defining at least one locking channel extending downwardly from said open top and including a narrowed central portion and an outwardly angled lower portion; a cover having a first and a second end; and a resilient locking prong depending downwardly from each end of said cover for advancement into one of said channels, said locking prong including a narrowed central portion and an angled lower portion coincident to the angled portion of its corresponding channel when the cover is fully positioned on said housing.

2. The body of claim 1 wherein said locking prong is integral with said cover.

3. The body of claim 2 wherein said cover is a unitary member made of nylon.

4. The body of claim 1 wherein each of said locking channels includes a substantially straight side and a substantially V-shaped side, said V-shaped side being undercut, and wherein each of said locking prongs includes a tapered side adapted to interlock with the undercut side.

5. A body for an electrical wiring device which comprises: a housing having an open top and a first and a second end, each of said housing ends defining on its outer surface a pair of spaced, substantially parallel locking channels extending downwardly from said open top, each channel including a narrowed portion intermediate its ends; a cover having a first and a second end; and a pair of substantially parallel resilient locking prongs integral with said cover and depending downwardly from each end of said cover for advancement into one of said pairs of channels, each of said locking prongs including a narrowed portion intermediate its ends coincident with the narrowed portion of its corresponding channel when the cover is fully positioned on said housing.

6. The body of claim 5 wherein the inner side of each channel of each pair is substantially straight and the outer side is V-shaped.

7. The body of claim 6 wherein the outer side of each channel is undercut and wherein the outer side of each locking prong is tapered to underlie said undercut portion when the cover is fully positioned on said housing.

8. The body of claim 5 wherein said cover is a unitary member made of nylon.

References Cited
UNITED STATES PATENTS 2,665,353   1/1954   Popp _____ 200—168
2,744,650   5/1956   Wossner _____ 220—60

THERON E. CONDON, *Primary Examiner.*

G. T. HALL, *Assistant Examiner.*